United States Patent
Nikopour et al.

(10) Patent No.: US 8,639,282 B2
(45) Date of Patent: Jan. 28, 2014

(54) SYSTEM AND METHOD FOR UPLINK POWER CONTROL IN A COMMUNICATIONS SYSTEM

(75) Inventors: Hosein Nikopour, Ottawa (CA); Zhijun Chao, Ottawa (CA)

(73) Assignee: FutureWei Technologies, Inc., Plano, TX (US)

( * ) Notice: Subject to any disclaimer, the term of this patent is extended or adjusted under 35 U.S.C. 154(b) by 308 days.

(21) Appl. No.: 13/159,618

(22) Filed: Jun. 14, 2011

(65) Prior Publication Data
US 2012/0322493 A1      Dec. 20, 2012

(51) Int. Cl.
 *H04B 7/00* (2006.01)
 *H04W 52/18* (2009.01)

(52) U.S. Cl.
 USPC ........ 455/522; 455/69; 455/452.2; 455/115.1

(58) Field of Classification Search
 USPC .................. 455/522, 69, 452.2, 452.1, 67.11, 455/67.13, 517, 126, 115.3, 115.1, 125, 455/127.1
 See application file for complete search history.

(56) References Cited

U.S. PATENT DOCUMENTS

| | | | |
|---|---|---|---|
| 2007/0060187 A1* | 3/2007 | Englund et al. | 455/522 |
| 2010/0105406 A1* | 4/2010 | Luo et al. | 455/452.2 |
| 2011/0136533 A1* | 6/2011 | Senarath et al. | 455/522 |

\* cited by examiner

*Primary Examiner* — John J Lee
(74) *Attorney, Agent, or Firm* — Slater & Mastil, L.L.P.

(57) ABSTRACT

A system and method for power control in a communications system are provided. A method for controller operations includes determining a power level for a communications device, and adjusting the power level for the communications device to increase a bandwidth utilization of the communications device, where the adjusting is based on a minimum performance metric for the communications device. The method also includes signaling the adjusted power level to the communications device.

27 Claims, 7 Drawing Sheets

SYSTEM AND METHOD FOR UPLINK POWER CONTROL IN A COMMUNICATIONS SYSTEM

TECHNICAL FIELD

The present invention relates generally to digital communications, and more particularly to a system and method for uplink power control in a communications system.

BACKGROUND

Generally, in a modern communications system, transmit power control may be crucial to an overall performance of the communications system. Transmit power control may be able to reduce inter-cell interference in the communications system, as well as help communications devices (also commonly referred to as User Equipment (UE), mobiles, mobile stations, users, subscribers, terminals, and so on) achieve a required Signal to Interference plus Noise Ratio (SINR).

Consider, for example, a Third Generation Partnership Project (3GPP) Long Term Evolution (LTE) compliant communications system, wherein Orthogonal Frequency Division Multiple Access (OFDMA) is used as a basic access scheme for a downlink (DL) between an enhanced NodeB (eNB) (also commonly referred to as NodeB, base station, controller, communications controller, and so forth) and UEs served by the eNB. While, on the uplink (UL), Single Carrier FDMA (SC-FDMA) is used as a basic access scheme. SC-FDMA, which has better Peak to Average Power Ratio (PAPR) properties than OFDMA. The selection of SC-FDMA was made in part due to stricter power restrictions in UEs.

Typically, there are two different types of power control: open loop power control (OLPC) and closed loop power control (CLPC). In CLPC, a controller, such as in an eNB, may adjust the transmit power, for example, of UEs, based on feedback information. While, as its name suggests, in OLPC a communications device, such as a UE, may set its own transmit power level without any feedback from a controller. The two different types of power control may be used separately or in conjunction to control the transmit power level of communications devices in a communications system.

SUMMARY OF THE INVENTION

These and other technical advantages are generally achieved, by example embodiments of the present invention which provide a system and method for UL power control in a communications system.

In accordance with an example embodiment of the present invention, a method for controller operations is provided. The method includes determining a power level for a communications device, adjusting the power level for the communications device to change a bandwidth utilization of the communications device, where the adjusting is based on a minimum performance metric for the communications device, and signaling the adjusted power level to the communications device.

In accordance with another example embodiment of the present invention, a method for controller operations is provided. The method includes selecting a power control operating mode by a controller, where the selecting is based on a condition of a communications system, where the power control operating mode comprises either a first power control mode or a second power control mode, and where the second power control mode adjusts a power spectral density of transmissions made by at least one communications device with respect to a performance constraint. The method also includes performing power control for at least one communications device using a power control technique corresponding to the power control operating mode, thereby producing information about a transmit power level, and signaling the information.

In accordance with another example embodiment of the present invention, a method for controller operations is provided. The method includes determining if a power control switch condition is met, performing power control for at least one communications device using a first power control technique to determine a transmit power level for the at least one communications device if the power control switch condition is not met, and performing power control for the at least one communications device using a second power control technique to determine the transmit power level for the at least one communications device if the power control switch condition is met. The second power control technique adjusts a power spectral density of transmissions made by the at least one communications device with respect to a performance constraint. The method also includes signaling information about the transmit power level.

In accordance with another example embodiment of the present invention, a controller is provided. The controller includes a power control unit, and a transmitter coupled to the power control unit. The power control unit selects a power control operating mode, where the selecting is based on a condition of a communications system, where the power control operating mode comprises either a first power control mode or a second power control mode, where the second power control mode adjusts a power spectral density of transmissions made by the at least one communications device with respect to a performance constraint. The power control unit performs power control for at least one communications device using either the first power control mode or the second power control mode, thereby producing information about a transmit power level. The transmitter signals the information.

In accordance with another example embodiment of the present invention, a controller is provided. The controller includes a power control unit, and a transmitter coupled to the power control unit. The power control unit determines if a power control switch condition is met, and selectively performs power control for the at least one communications device based on the power control switch condition. The power control unit performs power control for the at least one communications device using a first power control technique to determine a transmit power level for the at least one communications device if the power control switch condition is not met, and the power control unit performs power control for the at least one communications device using a second power control technique to determine the transmit power level for the at least one communications device if the power control switch condition is met. The second power control technique adjusts a power spectral density of transmissions made by the at least one communications device with respect to a performance constraint. The transmitter signals information about the transmit power level.

One advantage disclosed herein is that both the transmit power of communications devices in a communications system and available bandwidth in the communications system are fully utilized. Thereby maximizing the performance of the communications system.

A further advantage of exemplary embodiments is that full utilization of transmit power and available bandwidth are achievable for situations when there is a low number of active UE per cell as well as when there is a large number of active UE per cell.

Yet another advantage of exemplary embodiments is that a wide range of UE pathloss is supported.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a 3GPP LTE compliant communications system. The invention may also be applied, however, to other standards compliant communications systems, such as those that are WiMAX, IEEE 802.16, and so forth, compliant, as well as communications systems that are not standards compliant.

Figure 1:
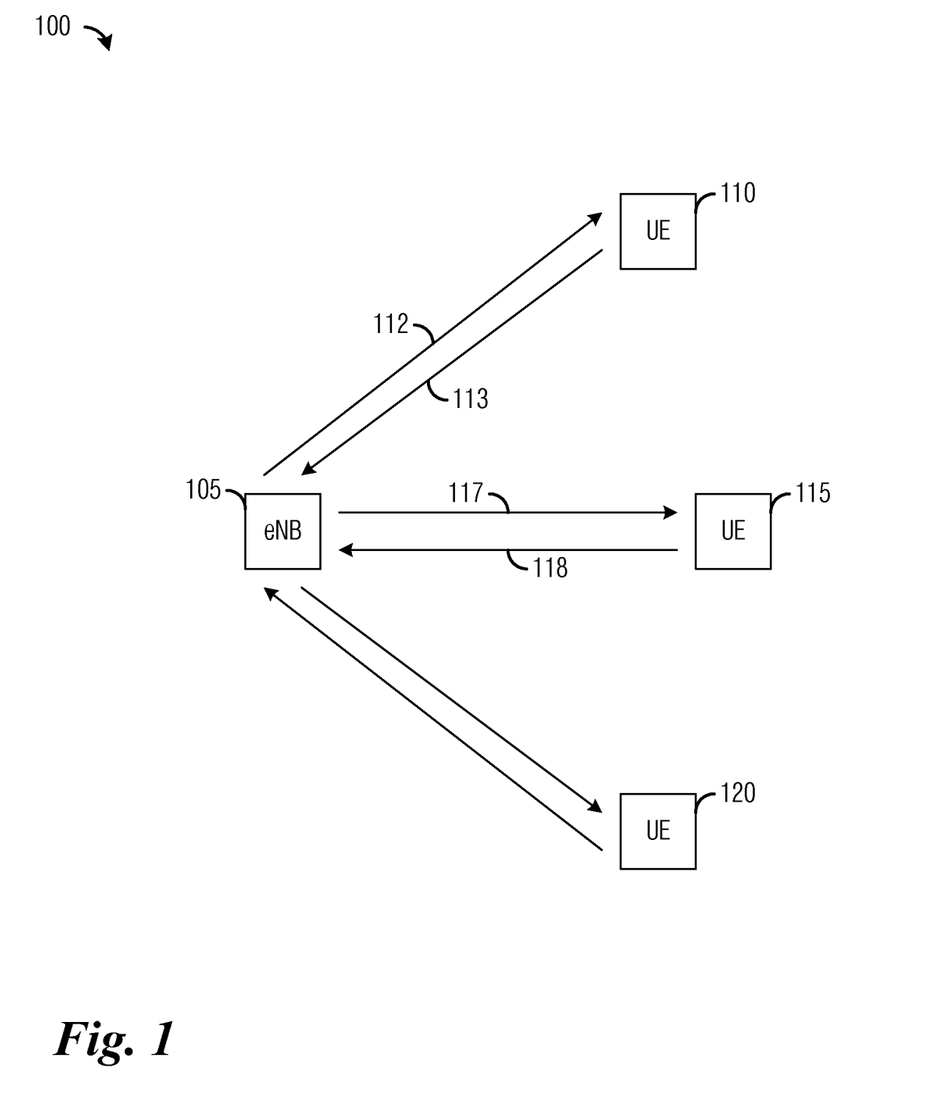
FIG. 1 illustrates an example communications system according to example embodiments described herein.

FIG. 1 illustrates a communications system 100. Communications system 100 includes an eNB 105 that is serving a number of UEs, such as UE 110, UE 115, and UE 120. While it is understood that communications systems may employ multiple eNBs capable of communicating with a number of UEs, only one eNB, and three UEs are illustrated for simplicity.

eNB 105 may communicate with UE 110 over a DL 112, while UE 110 may communicate with eNB 105 over an UL 113. Similarly, eNB 105 and UE 115 may communicate over DL 117 and UL 118.

Transmissions on both a DL and an UL may be power controlled to help reduce inter-cell interference and to help achieve a required SINR ratio. Power control, in the form of OLPC and/or CLPC, may be used to help set the transmit power level of DL and/or UL transmissions.

One widely known form of power control used in 3GPP LTE is fractional power control (FRPC). For the UL, FRPC may be expressed as $$PSD_{TX} = P_0 + \alpha PL,$$

where $P_0$ is a target received power in dBm per resource block (dBm/RB), PL is pathloss of a UE to its serving cell in dB, $\alpha$ is a fractional compensation factor for pathloss ($0 \leq \alpha \leq 1$), and $PSD_{TX}$ is a transmit power spectral density in dBm/RB.

Another widely known form of power control used in 3GPP LTE for the UL is geometry-based power control (GPC). GPC is an enhanced version of FRPC and makes use of increased transmit power density of a UE in addition to FRPC, wherein the transmit power density is inversely proportional to an interference leakage of the UE to neighboring cells. In GPC, DL geometry is used as an interference indicator for the UL, with higher DL geometry corresponding to lower interference to neighboring cells and vice versa. In GPC, the transmit power density of a UE is increased proportional to its DL geometry and may be expressed as $$PSD_{TX} = P_0 + \alpha PL + \beta SINR_{DL},$$

$$SINR_{DL} = \begin{cases} DL \text{ geometry} & \text{if } DL \text{ geometry} > 0 \\ 0 & \text{otherwise} \end{cases}$$

where $SINR_{DL}$ is the DL geometry in dB and $\beta$ is a scaling factor less than one. Practically, $SINR_{DL}$ helps to maintain coverage area throughput for cell-edge users and is ignored if it is negative. Note that GPC reduces to FRPC if $\beta$ is equal to zero.

However, GPC may not perform well in all scenarios. For example, when there is a small number of active UEs (scheduled UEs) per cell, due to no interference, the geometry of a UE is very high and the transmit power density of the UE is also very high so that it cannot fully utilize the entirety of the bandwidth of the cell, i.e., the UE is bandwidth limited. Although the transmit power of the UE is fully utilized, the throughput of the UE is low due to underutilization of the bandwidth.

As another example, in a scenario wherein there is a mixture of indoor UEs and outdoor UEs, GPC may not perform well. Generally, indoor UEs have high pathloss to their serving cell but their DL geometry may be comparable to outdoor UEs. GPC may increase the transmit power density of the indoor UEs so that their capability to use enough bandwidth decreases. Therefore, the coverage throughput of the communications system drops due to the high power density of the indoor UEs.

Since GPC may perform well in situations with a large number of active UEs or when active UEs have similar pathloss, it may be advantageous to combine GPC with a modified power control technique that performs well in situations with a small number of active UEs or when active UEs have dissimilar pathloss by adjusting the power spectral density with a constraint placed on UE SINR. The combination of GPC and the modified power control technique may be referred to herein as Modified GPC (MGPC). According to an example embodiment, when the number of active UEs in a cell is small (for example, on the order of two or three UEs or less) the modified power control technique may be used. While, if the number of active UEs is large (more than four UEs, for example), then GPC may be used to provide power control.

According to an example embodiment, MGPC may also be configured to operate in a manner similar to GPC by setting a minimum target bandwidth for UEs to a small value, or setting a minimum SINR requirement to a large value, for example, when the number of active UEs is large. As an example, MGPC may be configured to operate in a GPC like manner by setting the minimum target bandwidth to a small number of RBs, for example, one, two, or three RBs, typically on the order of a smallest (or about the smallest number of allocatable network resource) Similarly, the minimum SINR requirement may be set to a large dB value, for example, more than 25 dB, typically on the order of several times a typical minimum SINR requirement or more.

An actual threshold that may be used to determine whether GPC or the modified power control technique is used may be dependent on a number of considerations, such as a total number of UEs in the communications system, a total number of UEs operating in an eNB's coverage area, available computation resources, communications system load, communications system traffic pattern, UE mobility, UE pathloss, UE geometry, and so forth.

Figure 2:
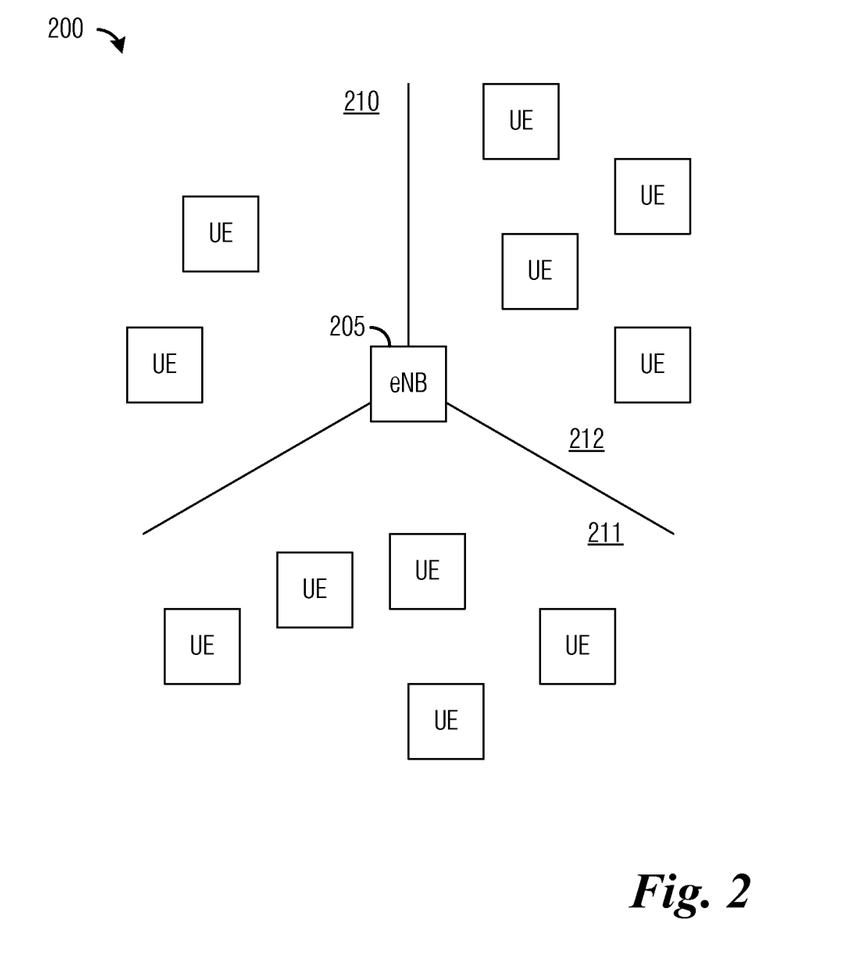
FIG. 2 illustrates an example communications system, wherein Modified Geometry-based Power Control (MGPC) is used to set the transmit power level of UEs in the communications system according to example embodiments described herein.

FIG. 2 illustrates a communications system 200, wherein MGPC is used to set the transmit power level of UEs in communications system 200. Communications system 200 includes an eNB 205 that is sectorized into three cells with coverage areas 210, 211, and 212, respectively. In coverage area 210, there are two active UEs, in coverage area 211, there are five active UEs, and in coverage area 212, there are four active UEs. There may actually be more UEs operating in the coverage areas, however, active UEs may be UEs that are selected for transmission by a scheduler of eNB 205.

For discussion purposes, let a threshold for deciding to use GPC or the modified power control technique in setting the transmit power level of the UEs be equal to three UEs. Then, as shown in FIG. 2, the UEs in coverage area 210 may have their transmit power level set by the modified power control technique, while the UEs in coverage areas 211 and 212 may have their transmit power level set by GPC.

Figure 3:
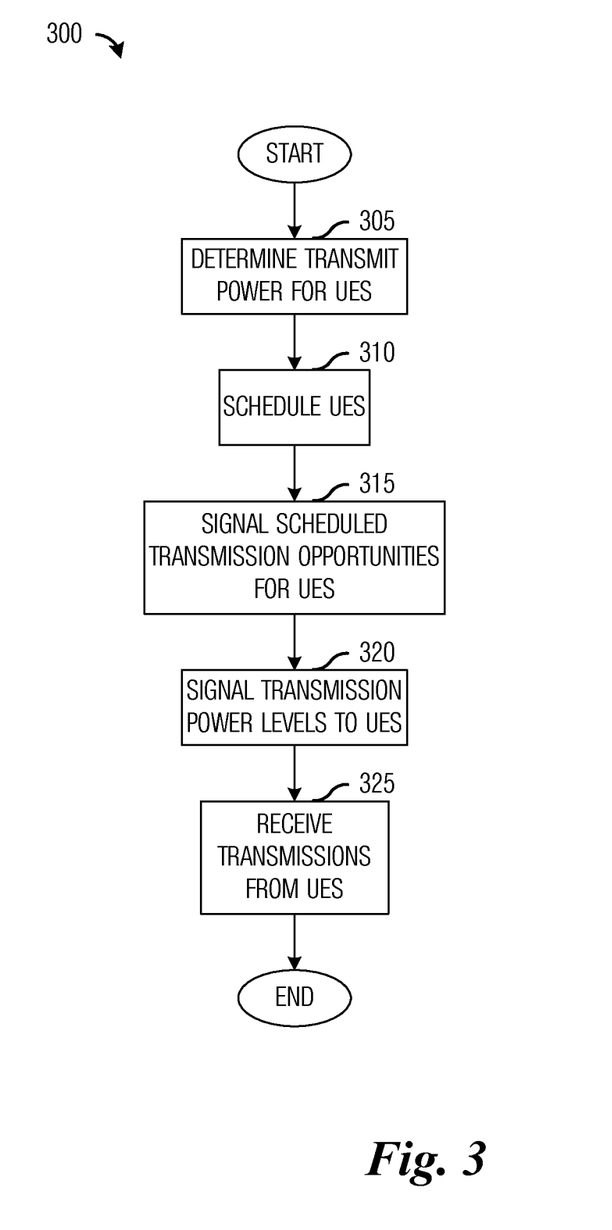
FIG. 3 illustrates an example flow diagram of eNB operations according to example embodiments described herein.

FIG. 3 illustrates a flow diagram of eNB operations 300. eNB operations 300 may be indicative of operations occurring in an eNB, such as eNB 205, as the eNB grants transmission opportunities to UEs served by the eNB and receives transmissions from the UEs. eNB operations 300 may occur while the eNB is in a normal operating mode and has UEs to serve.

eNB operations 300 may begin with the eNB determining a transmit power level for the UEs that have been scheduled (block 305). According to an example embodiment, the eNB may make use of MGPC to determine the transmit power level for the UEs. The eNB may determine the transmit power level for each of the UEs individually or the eNB may determine the transmit power level for all of the UEs belonging to a group of UEs. For example, cell-center UEs may all be assigned a single transmit power level.

The eNB may also schedule transmission opportunities for UEs that it is serving (block 310). Typically, a scheduler in the eNB may schedule transmission opportunities for a subset of the UEs that are operating within a coverage area of the eNB. The scheduler may schedule the UEs of the eNB as a whole or on a per cell basis if the eNB is sectorized.

The eNB may signal the scheduled transmission opportunities to the scheduled UEs (block 315). For example, in a 3GPP LTE compliant communications system, the eNB may signal the scheduled transmission opportunities to the UEs individually over a control channel.

The eNB may also signal transmission power levels to the scheduled UEs (block 320). According to an example embodiment, the eNB may signal the transmission power level to the scheduled UEs along with its signaling of the transmission opportunities. According to an example embodiment, the eNB may individually signal the transmission power levels to the scheduled UEs. According to an example embodiment, the eNB may signal the transmission power level separately from the signaling of the transmission opportunities.

The eNB may then receive transmissions from the scheduled UEs at the scheduled transmission opportunities (block 325).

Figure 4A:
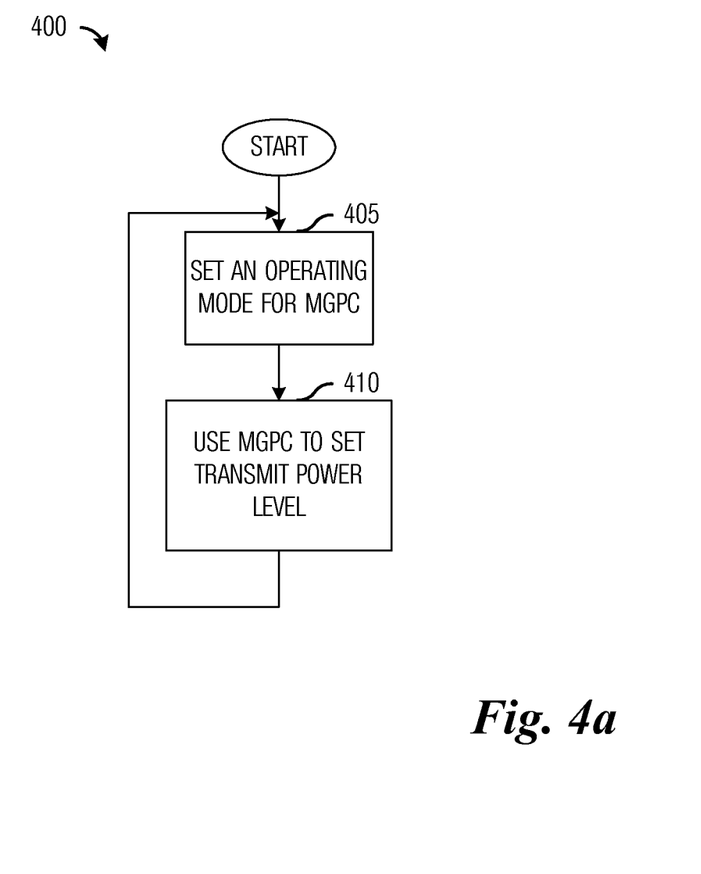
FIG. 4a illustrates an example flow diagram of operations in setting transmit power level, wherein MGPC operates in multiple modes according to example embodiments described herein.

FIG. 4a illustrates a flow diagram of operations 400 in setting transmit power level, wherein MGPC operates in multiple modes. Operations 400 may be indicative of operations occurring in an eNB, such as eNB 205, as the eNB sets transmit power levels of UEs served by the eNB. The eNB may be utilizing MGPC to set the transmit power levels of UEs to help ensure good performance for a wide range of conditions, wherein MGPC is capable of operating in a GPC-like manner by setting a minimum bandwidth for UEs to a small value. Operations 400 may be an implementation of determining transmit power for UEs, block 310 of FIG. 3. Operations 400 may occur while the eNB is in a normal operating mode.

Operations 400 may begin with the eNB setting an operating mode for MGPC (block 405). As discussed previously, MGPC may be capable of operating in a GPC-like manner by setting the minimum allocatable bandwidth for UEs to a small value or a minimum SINR requirement to a large value. Therefore, depending on communications system conditions, MGPC may either operate like GPC or as the modified power control technique that adjusts the power spectral density of the UEs to increase the UE's bandwidth with respect to a SINR constraint.

According to an example embodiment, if a number of UEs being served in a time to transmit interval (TTI) is small, then eNB may configure MGPC to operate in the modified power control (MPC) mode. In order for MGPC to operate in MPC mode, the eNB may set the minimum allocatable bandwidth for UEs to a large value (e.g., several times larger than a largest typical bandwidth allocation or more), a minimum SINR requirement to a small value (e.g., about equal to a smallest SINR value where performance becomes unacceptable), or a combination thereof. While if the number of UEs is large, then the eNB may configure MGPC to operate in the GPC mode at least for a subset of the UEs. In order for MGPC to operate in the GPC mode, the eNB may set the minimum allocatable bandwidth to a small value (e.g., about equal to a smallest allocatable bandwidth), a minimum SINR requirement to a large value (e.g., several times larger than a typical minimum SINR value), or a combination thereof.

According to an example embodiment, a distribution of indoor UEs and outdoor UEs may also be used to determine an operating mode of MGPC. For example, if a ratio of indoor UEs to outdoor UEs meets a threshold, then the eNB may set the operating mode of MGPC to GPC, while if the ratio does not meet the threshold, then the eNB may set the operating mode of MGPC to MPC.

With the operating mode of MGPC set, the eNB may set the transmit power level of the UEs (block 410). According to an example embodiment, the eNB may set the transmit power level of the UEs individually. According to an example embodiment, the eNB may set the transmit power level of groups or types of UEs (for example, cell-center UEs, cell-edge UEs, and so forth) individually. According to an example embodiment, the eNB may send a single transmit power level for all UEs.

When the operating mode of MGPC is set to MPC, the transmit power level of the UEs may be determined by adjusting the power spectral density of the UEs, thereby potentially allowing the UEs to use more RBs, therefore, access more communications system bandwidth. However, since decreasing the power spectral density may have an impact on the SINR of the UEs, the adjustments to the power spectral density may be constrained based on a minimum SINR, i.e., a UE's UL SINR may not fall below a minimum UL SINR value. According to an example embodiment, the eNB may set the transmit power level of each of the UEs individually.

Figure 4B:
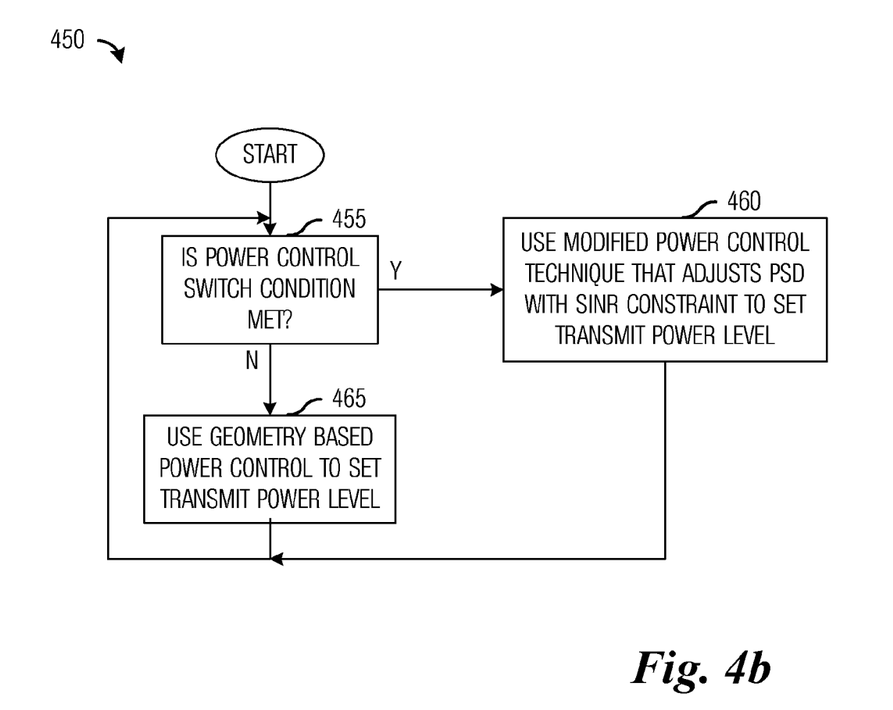
FIG. 4b illustrates an example flow diagram of operations in setting transmit power level according to example embodiments described herein.

FIG. 4b illustrates a flow diagram of operations 450 in setting transmit power level. Operations 450 may be indicative of operations occurring in an eNB, such as eNB 205, as the eNB sets transmit power levels of UEs served by the eNB. The eNB may be utilizing MGPC to set the transmit power levels of the UEs to help ensure good performance for a wide range of conditions. Operations 450 may be an implementation of determining transmit power for UEs, block 310 of FIG. 3. Operations 450 may occur while the eNB is in a normal operating mode.

Operations 450 may begin with the eNB performing a check to determine if a power control switch condition met (block 455). According to an example embodiment, the power control switch condition may be used to determine if GPC or the modified power control technique that adjusts the power spectral density of the UEs to increase the UE's bandwidth with respect to a SINR constraint is used. For example, if the power control switch condition is not met, then GPC is used, while if the power control switch condition is met, then the modified power control technique that adjusts the power spectral density of the UEs to increase the UE's bandwidth with respect to a SINR constraint is used.

According to an example embodiment, a power control switch condition may be a number of UEs being served in a TTI is small. The number of UEs being served in a TTI may be determined to be small if the number is smaller than a threshold. While if the number of UEs being served in the TTI is greater than the threshold, then the number of UEs being served may be determined to be large.

According to an example embodiment, a power control switch condition may be a distribution of indoor UEs and outdoor UEs. The distribution of indoor UEs and outdoor UEs being served by the eNB in a TTI may be used to determine which power control technique is used. For example, if a ratio of indoor UEs to outdoor UEs meets a threshold, then GPC is used, while if the ratio does not meet the threshold, then the modified power control technique that adjusts the power spectral density of the UEs to increase the UE's bandwidth with respect to a SINR constraint is used.

According to an example embodiment, a power control switch condition may be a combination of both the number of UEs being served in a TTI and the ratio of indoor UEs and outdoor UEs being served by the eNB in a TTI.

For discussion purposes, consider a situation wherein the power control switch condition is the number of UEs being served. However, the example embodiments discussed herein are also operable with other power control switch conditions, such as the ratio of indoor UEs and outdoor UEs. Therefore, the discussion of the power control switch being the number of UEs being served should not be construed as being limiting to either the scope or the spirit of the example embodiments.

If the number of UEs being served per TTI is small (i.e., the power control switch condition), then the eNB may use the modified power control technique that adjusts the power spectral density of some UEs to increase the UEs bandwidth with respect to a SINR constraint (i.e., MPC) to set the transmit power level of the UEs (block 460). In situations wherein the number of UEs being served is small, the transmit power level of the UEs may be determined by adjusting the power spectral density of the UEs, thereby potentially allowing the UEs to use more RBs, therefore, access more communications system bandwidth. However, since decreasing the power spectral density may have an impact on the SINR of the UEs, the adjustments to the power spectral density may be constrained based on a minimum SINR, i.e., a UE's UL SINR may not fall below a minimum UL SINR value. According to an example embodiment, the eNB may set the transmit power level of each of the UEs individually.

If the number of UEs being served per TTI is not small, then the eNB may use GPC to set the transmit power level of at least a subset of the UEs (block 465). In situations when there is a large number of UEs being served, the transmit power level of at least a subset of the UEs may be determined using GPC, which has been shown to give good results in such situations.

After setting the transmit power level of the UEs, the eNB may return to block 455 for another TTI. According to an example embodiment, operations 450 may be performed by each eNB for its individual cells (if the eNB is sectorized) and may be repeated for each TTI.

Figure 5:
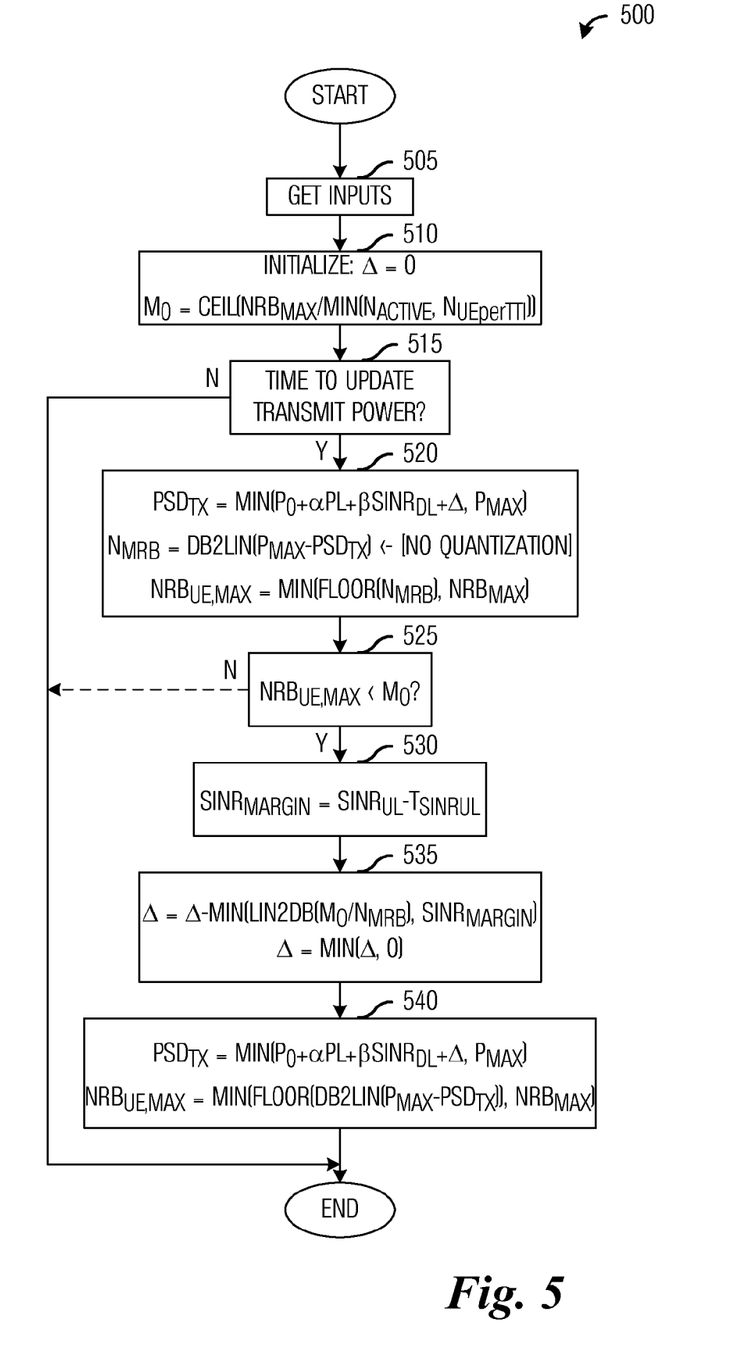
FIG. 5 illustrates an example flow diagram of operations in determining transmit power levels by adjusting the power spectral density of UEs with a constraint on SINR according to example embodiments described herein.

FIG. 5 illustrates a flow diagram of operations 500 in determining transmit power levels by adjusting the power spectral density of UEs with a constraint on SINR. Operations 500 may be indicative of operations occurring in an eNB, such as eNB 205, as the eNB determines the transmit power level of UEs served by the eNB by adjusting the power spectral density of the UEs with a constraint on SINR. Operations 500 may be an implementation of using the modified power control technique that adjusts the power spectral density of the UEs to increase the UE's bandwidth with respect to a SINR constraint to set the transmit power level of the UEs, block 410 of FIG. 4. Operations 500 may occur while the eNB is in a normal operating mode and has UEs to serve.

Operations 500 may begin with the eNB obtaining inputs that may be needed to determine the transmit power levels for the UEs served by the eNB (block 505). According to an example embodiment, the inputs needed to determine the transmit power levels may include:

1. $SINR_{DL}$—DL geometry if positive otherwise 0. DL geometry is measured or calculated by serving eNb or reported by UE to eNB
2. PL—Pathloss of UE to the eNB;
3. $P_0$, $\alpha$, and $\beta$—GPC parameters;
4. $P_{MAX}$—Maximum transmit power of a UE;

5. $NRB_{MAX}$—Maximum number of RBs that can be allocated for data transmission to a UE. This restriction is set by the scheduler;
6. SINRUL—Average (post-processing) UL SINR of a UE, averaged over multiple TTIs and allocated UL data RBs;
7. $N_{UEperTTI}$—Actual number of scheduled UEs in a TTI;
8. $T_{SINRUL}$—Minimum UL SINR requirement;
9. $N_{ACTIVE}$—A cap on the number of scheduled UEs per TTI;
10. Current TTI; and
11. Transmit power update rate.

Where inputs 1-4 are inputs used in GPC, input 5 is set by the scheduler and traffic buffer size, inputs 6-7 are inputs used in MGPC, inputs 8-9 are CLPC parameters used in MGPC, and inputs 10-11 are time parameters.

The eNB may also initialize some values used in the determining of the transmit power levels (block 510). According to an example embodiment, values that may be initialized may include $\Delta$ (a value representing a change in power spectral density) and $M_0$ (a value representing a target minimum number of allocated RBs for a UE, i.e., a minimum bandwidth for a UE). Initially, $\Delta$ may be set to zero and $M_0$ may be set as $$M_0 = CEIL(NRB_{MAX}/MIN(N_{ACTIVE}, N_{UEperTTI})),$$

where CEIL( ) is a ceiling function, and MIN( ) is a minimum function. The expression for $M_0$ may be an illustrative example of $M_0$ wherein the same $M_0$ may be applicable to all UEs being served by the eNB, i.e., a cell-specific value. However, $M_0$ may also be different for different UEs, i.e., a UE-specific value, or for different types and/or groups of UEs, i.e., a group/type-specific value. Non-cell-specific values of $M_0$ may be dependent on factors, such as eNB load, UE buffer size, UE traffic type, UE traffic pattern, UE Quality of Service constraints, and so forth.

The eNB may then perform a check to determine if it is time to update the transmit power levels for the UEs (block 515). According to an example embodiment, the eNB may perform an update of the transmit power levels for the UEs once per TTI. According to an example embodiment, the eNB may perform an update of the transmit power levels for the UEs once per multiple TTIs. According to an example embodiment, the eNB may perform an update of the transmit power levels for the UEs upon the occurrence of an event. For example, the event may be a reception of an instruction to perform the update of the transmit power levels for the UEs. Alternatively, the event may be a measure meeting a threshold. For example, the measure may be an error rate, such as a bit error rate, a frame error rate, a packet error rate, or so on. Alternatively, the event may be an SINR of a UE meeting a threshold.

If it is not time for the eNB to update the transmit power levels for the UEs, then operations 500 may terminate.

However, if it is time for the eNB to update the transmit power levels for the UEs, then the eNB may increase the bandwidth of the UEs by decreasing the power spectral density of the UEs. According to an example embodiment, the eNB may have the intent of allocating at least $M_0$ RBs to a UE. For example, if $N_{MRB}$ of a UE is less than $M_0$, then the power spectral density of the UE may need to be decreased (for example, $PSD_{TX} = PSD_{TX} - 10 \log_{10}(M_0/N_{MRB})$).

However, the decrease in the power spectral density of the UE may have an impact on the SINR of the UE, therefore, the eNB may decrease the power spectral density of the UE as long as the SINR of the UE remains above a minimum SINR requirement. For discussion purposes, if the minimum SINR requirement of the UE is $T_{SINRUL}$, then the power spectral density of the UE cannot be decreased by more than $SINR_{UL} - T_{SINRUL}$.

Considering the desire to increase the bandwidth of the UE and the minimum SINR requirement, the power spectral density of the UE may be modified as follows $$PSD_{TX} = PSD_{TX} - \min(10 \log_{10}(M_0/N_{MRB}), SINR_{UL} - T_{SINRUL}).$$

The eNB may determine the transmit power level of the UEs by determining a transmit power spectral density of a UE ($PSD_{TX}$), a maximum number of allocated RBs for the UEs ($N_{MRB}$), and a maximum number of RBs that may be allocated to a UE considering a power constraint ($NRB_{UE,MAX}$) (block 520). The determination of $PSD_{TX}$, $N_{MRB}$, and $NRB_{UE,MAX}$ may be expressed as $$PSD_{TX} = MIN(P_0 + \alpha PL + \beta SINR_{DL} + \Delta, P_{MAX})$$

$$N_{MRB} = DB2LIN(P_{MAX} - PSD_{TX}) < -[\text{NO QUANTIZATION}]$$

$$NRB_{UE,MAX} = MIN(FLOOR(N_{MRB}), NRB_{MAX}),$$

where FLOOR( ) is a floor function, and DB2LIN( ) change a linear quantity to a dB value.

The eNB may then perform a check to determine if the maximum number of RBs that may be allocated to a UE considering the power constraint ($NRB_{UE,MAX}$) is less than the target minimum number of allocated RBs for a UE ($M_0$) (block 525). In block 525, the eNB may be performing a check to determine if the bandwidth allocated to the UEs is meeting a minimum bandwidth allocation. The check may need to be removed for scenarios wherein there exists at least one mobile UE being served by the eNB. In this scenario, after setting $\Delta$ according to MGPC power control, the mobile UE may need to have a chance to get back to normal GPC power level in certain conditions ($\Delta=0$, for example) while it moves. In order to facilitate the return to normal GPC power level, the check may be removed. In other scenarios in which all UEs are nomadic and there is no chance of geometry change, the check may be applied just to skip the unnecessary computation. The check in these particular scenarios may have no impact on the outcome of MGPC.

If the check resulted in a YES determination, then the eNB may need to make some adjustments to the transmit power level of the UEs in order to increase the bandwidth allocated to the UEs (however, the adjustment to the transmit power level of the UE may need to allow the UE to meet its minimum SINR requirement), including determining a $SINR_{MARGIN}$ (block 530), the change in power spectral density, $\Delta$ (block 535), as well as an adjusted $PSD_{TX}$ and the maximum number of RBs that may be allocated to a UE considering the power constraint ($NRB_{UE,MAX}$) (block 540). The determination of $SINR_{MARGIN}$, $\Delta$, $PSD_{TX}$, and $NRB_{UE,MAX}$ may be expressed as $$SINR_{MARGIN} = SINR_{UL} - T_{SINRUL}$$

$$\Delta = \Delta - MIN(LIN2DB(M_0/N_{MRB}), SINR_{MARGIN}) \text{ and}$$
$$\Delta = MIN(\Delta, 0)$$

$$PSD_{TX} = MIN(P_0 + \alpha PL + \beta SINR_{DL} + \Delta, P_{MAX})$$

$$NRB_{UE,MAX} = MIN(FLOOR(DB2LIN(P_{MAX} - PSD_{TX})), NRB_{MAX}).$$

After the adjustments by the eNB or if $NRB_{UE,MAX} < M_0$, then the eNB may have determined the power spectral density for the UE ($PSD_{TX}$) in dBm/RB and a maximum number of RBs that may be allocated to a UE considering the power constraint ($NRB_{UE,MAX}$). The $PSD_{TX}$ and $NRB_{UE,MAX}$ may be used by the eNB to set the transmit power level of the UE and to determine a number of RBs to allocate to the UE. As an example, the $NRB_{UE,MAX}$ may be used by a scheduler in the eNB to schedule a transmission opportunity for the UE, while the transmit power level may be signaled to the UE.

According to an example embodiment, the eNB may determine the power spectral density for each UE. According to an example embodiment, the eNB may determine the power spectral density for each group or type of UEs.

Figure 6A:
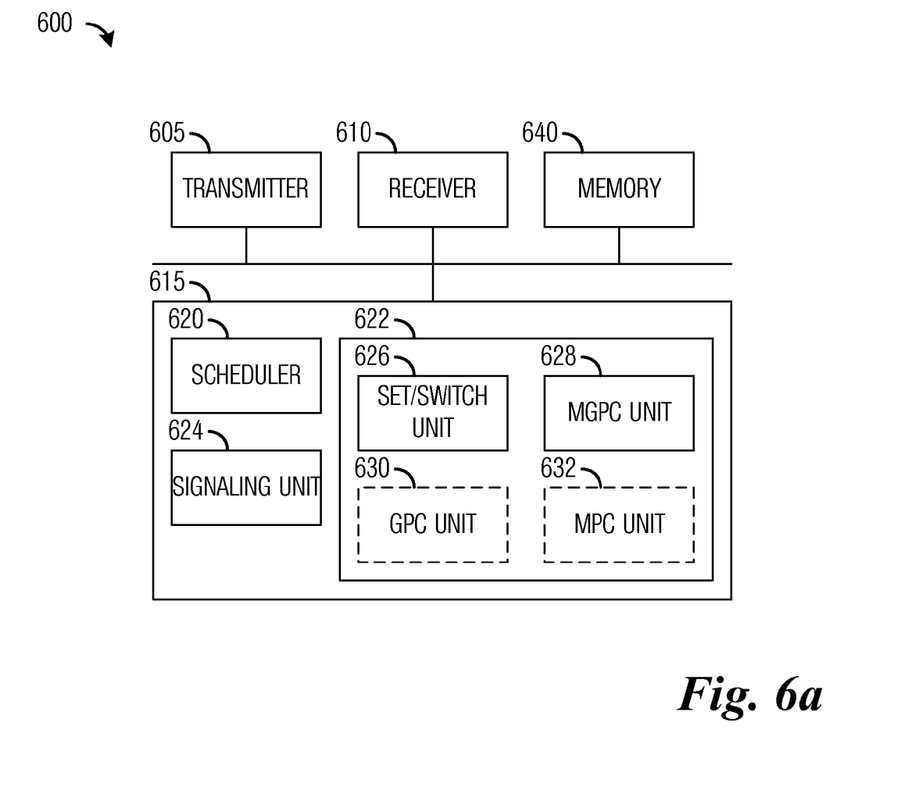
FIG. 6a provides an example communications device according to example embodiments described herein.

FIG. 6a provides an alternate illustration of a communications device 600. Communications device 600 may be an implementation of a controller, such as an eNB, that may be used to schedule transmission opportunities of communications devices, such as UEs, of a communications system. Communications device 600 may be used to implement various ones of the embodiments discussed herein. As shown in FIG. 6, a transmitter 605 is configured to transmit information and a receiver 610 is configured to receive information.

A scheduler 620 is configured to schedule transmission opportunities for UEs served by communications device 600. A power control unit 622 is configured to determine transmit power levels for UEs scheduled by communications device 600. Power control unit 622 is configured to use MGPC, which depending on a power control switch condition, may use either GPC or the modified power control technique that adjusts the power spectral density of the UEs to increase the UEs bandwidth with respect to a SINR constraint to determine the transmit power level of the UEs.

Power control unit 622 includes a set/switch unit 626 that is configured to set values to determine an operating mode of power control unit 622. Set/switch unit 626 is configured to set the values based on communications system conditions. For example, set/switch unit 626 may set the values based on a number of active UEs served by communications device 600, a nature of active UEs served by communications device 600 (such as indoor UE, outdoor UE, pathloss, and so forth), or so on. Power control unit 622 also includes a MGPC unit 628 that is configured to determine the transmit power of UEs. MGPC unit 628 may operate in several operating modes that may be determined based on operating conditions. For example, MGPC unit 628 may operate in a GPC mode that uses a GPC power control technique to determine transmit power levels of UEs or a MPC mode that uses a MPC power control technique to determine transmit power levels of UEs as well as increase the bandwidth of the UEs by decreasing power spectral density under a minimum SINR restriction for the UEs. MGPC unit 628 may switch between the operating modes based on values such as minimum allocatable bandwidth for UEs, minimum SINR restriction, or a combination thereof.

Alternatively, power control unit 622 includes the set/switch unit 628 that is configured to select with power control technique to use to determine the transmit power levels based on the power control switch condition. A GPC unit 630 is configured to determine the transmit power levels using a GPC algorithm. A MPC unit 632 is configured to determine the transmit power levels using the modified power control technique that adjusts the power spectral density of the UEs to increase the UE's bandwidth with respect to a SINR constraint.

A signaling unit 624 is configured to signal the transmission opportunities and/or the transmit power level to the UEs. A memory 640 is configured to store power control switch conditions, inputs for the power control techniques, thresholds, minimum SINR constraints, and so forth.

The elements of communications device 600 may be implemented as specific hardware logic blocks. In an alternative, the elements of communications device 600 may be implemented as software executing in a processor, controller, application specific integrated circuit, or so on. In yet another alternative, the elements of communications device 600 may be implemented as a combination of software and/or hardware.

As an example, receiver 610 and transmitter 605 may be implemented as a specific hardware block, while scheduler 620, power control unit 622 (including MGPC unit 626 and/or alternatively switch unit 628, GPC unit 630, and MPC unit 632), and signaling unit 624 may be software modules executing in a microprocessor (such as processor 615), a custom circuit, a custom compiled logic array of a field programmable logic array, or combinations thereof.

Figure 6B:
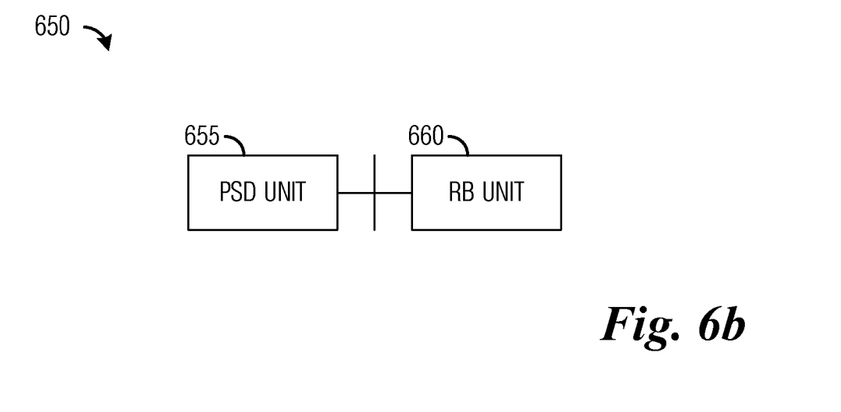
FIG. 6b illustrates an example modified power control (MPC) unit according to example embodiments described herein.

FIG. 6b illustrates a MGPC unit 650. MGPC unit 650 may be an implementation of MGPC unit 626 shown in FIG. 6a. Alternatively, MGPC unit 650 may be an implementation of MPC unit 632 of FIG. 6a. MGPC unit 650 includes a PSD unit 655, and a RB unit 660. PSD unit 655 is configured to determine a power spectral density for UEs served by an eNB. PSD unit 655 is also configured to adjust the power spectral density in order to increase a RB utilization of the UEs subject to a minimum SINR constraint. RB unit 660 is configured to determine a number of RBs that can be allocated to UEs based on the power spectral density. RB unit 660 is also configured to ensure that the number of RBs that can be allocated to the UEs does not exceed a maximum number of RBs that can be allocated to the UEs. RB unit 660 is also configured to ensure that the number of RBs that can be allocated to the UEs exceeds a minimum number of RBs that can be allocated to the UEs.

The above described embodiments of communications device 600 and MGPC unit 650 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 3, 4a, 4b, and 5—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controller operations, the method comprising:
   determining, by a controller, if a power control switch condition is met;
   when the power control switch condition is met, setting a transmit power level of a communications device by adjusting a power spectral density for transmissions by the communications device to change a bandwidth utilization of the communications device, wherein the adjusting is in accordance with a minimum performance metric for the communications device;
   when the power control switch condition is not met, using geometry-based power control to set the transmit power level of the communications device; and
   signaling the transmit power level to the communications device.

2. The method of claim 1, wherein adjusting the power spectral density comprises:
   decreasing the transmit power level of the communications device; and
   increasing a bandwidth amount allocated to the communications device.

3. The method of claim 2, wherein the decreasing and the increasing occur when the performance metric exceeds a threshold.

4. The method of claim 3, wherein the performance metric comprises a signal to interference plus noise ratio.

5. The method of claim 3, wherein the threshold comprises a minimum signal to interference plus noise ratio.

6. The method of claim 1, wherein the power control switch condition comprises a number of communications devices scheduled by the controller meeting a first threshold, a ratio of high pathloss communications devices to low pathloss communications devices scheduled by the controller meeting a second threshold, or a combination thereof.

7. The method of claim 1, wherein the adjusting the power spectral density occurs in response to determining that a bandwidth allocated to the communications device does not meet a minimum bandwidth requirement.

8. The method of claim 1, wherein signaling the transmit power level comprises transmitting information about the transmit power level to the communications device.

9. A method for controller operations, the method comprising:
   selecting a power control operating mode by a controller, wherein the selecting is in accordance with a condition of a communications system, wherein the power control operating mode comprises either a first power control mode or a second power control mode, and wherein the second power control mode adjusts a power spectral density of transmissions made by at least one communications device with respect to a performance constraint;
   performing power control for the at least one communications device using a power control technique corresponding to the power control operating mode, thereby producing information about a transmit power level; and
   signaling the information.

10. The method of claim 9, wherein selecting the power control operating mode comprises:
    selecting the first power control mode when a number of communications devices scheduled by the controller meets a first threshold; and
    selecting the second power control mode when the number of communications devices scheduled by the controller does not meet the first threshold.

11. The method of claim 9, wherein selecting the power control operating mode comprises:
    selecting the first power control mode when a ratio of high pathloss communications devices to low pathloss communications devices scheduled by the controller meets a second threshold; and
    selecting the second power control mode when the ratio of high pathloss communications devices to low pathloss communications devices scheduled by the controller does not meet the second threshold.

12. The method of claim 9, wherein selecting the first power control mode for the power control operating mode comprises setting a minimum allocatable number of resources for the at least one communications device to a small value, setting a signal to interference plus noise ratio requirement for the at least one communications device to a large value, or a combination thereof.

13. A method for controller operations, the method comprising:
    determining if a power control switch condition is met;
    performing power control for at least one communications device using a first power control technique to determine a transmit power level for the at least one communications device when the power control switch condition is not met;
    performing power control for the at least one communications device using a second power control technique to determine the transmit power level for the at least one communications device when the power control switch condition is met, wherein the second power control technique adjusts a power spectral density of transmissions made by the at least one communications device with respect to a performance constraint; and
    signaling information about the transmit power level.

14. The method of claim 13, wherein the power control switch condition comprises a number of communications devices scheduled by a controller meeting a first threshold, a ratio of high pathloss communications devices to low pathloss communications devices scheduled by the controller meeting a second threshold, or a combination thereof.

15. The method of claim 14, wherein the power control switch condition comprises the number of communications devices scheduled by the controller meeting the first threshold, and wherein the first threshold comprises the number of communications devices scheduled by the controller being smaller than a specified number.

16. The method of claim 14, wherein the power control switch condition comprises the ratio of high pathloss communications devices to low pathloss communications devices scheduled by the controller meeting the second threshold, and wherein the second threshold comprises the ratio of high pathloss communications devices to low pathloss communications devices being smaller than a specified percentage.

17. The method of claim 13, wherein the first power control technique comprises a geometry-based power control.

18. The method of claim 13, wherein the second power control technique comprises:
    determining the transmit power level for the at least one communications device; and
    adjusting the transmit power level for the at least one communications device to change a bandwidth utilization of the at least one communications device, wherein the adjusting is in accordance with a minimum performance metric for the at least one communications device.

19. The method of claim 18, wherein adjusting the power level comprises:
   decreasing the power level of the at least one communications device; and
   increasing a bandwidth amount allocated to the at least one communications device.

20. The method of claim 13, wherein the at least one communications device comprises at least two communications devices, and wherein the method is performed for each communications device in the at least two communications devices.

21. A controller comprising:
   a power control unit configured
      to select a power control operating mode, wherein the selecting is in accordance with a condition of a communications system, wherein the power control operating mode comprises either a first power control mode or a second power control mode, wherein the second power control mode adjusts a power spectral density of transmissions made by at least one communications device with respect to a performance constraint, and
      to perform power control for the at least one communications device using either the first power control mode or the second power control mode, thereby producing information about a transmit power level; and
   a transmitter coupled to the power control unit, the transmitter configured to signal the information.

22. The controller of claim 21, wherein the power control unit comprises:
   a setting unit configured to select the power control mode; and
   a power control coupled to the setting unit, the power control configured to perform power control for at least one communications device using the first power control mode or the second power control mode responsive to a selection of the setting unit.

23. The controller of claim 21, wherein the condition of the communications system comprises a number of active communications device served by the controller, a nature of active communications devices served by controller, or a combination thereof.

24. A controller comprising:
   a power control unit configured to determine if a power control switch condition is met, and to selectively perform power control for at least one communications device in accordance with the power control switch condition, wherein the power control unit performs power control for the at least one communications device using a first power control technique to determine a transmit power level for the at least one communications device when the power control switch condition is not met, wherein the power control unit performs power control for the at least one communications device using a second power control technique to determine the transmit power level for the at least one communications device when the power control switch condition is met, and wherein the second power control technique adjusts a power spectral density of transmissions made by the at least one communications device with respect to a performance constraint; and
   a transmitter coupled to the power control unit, the transmitter configured to signal information about the transmit power level.

25. The controller of claim 24, wherein the power control unit comprises:
   a switch unit configured to determine if the power control switch condition is met;
   a first power control unit coupled to the switch unit, the first power control unit configured to perform power control for the at least one communications device using the first power control technique; and
   a second power control unit coupled to the switch unit, the second power control unit configured to power control for the at least one communications device using the second power control technique.

26. The controller of claim 25, wherein the first power control unit performs power control using a geometry-based power control technique.

27. The controller of claim 25, wherein the second power control unit comprises:
   a power spectral density unit configured to determine the power spectral density for the at least one communications device, and to adjust the power spectral density subject to a performance metric; and
   a resource block unit coupled to the power spectral density unit, the resource block unit configured to determine a number of resource blocks that are allocatable to the at least one communications device in accordance with the power spectral density.

* * * * *